(12) United States Patent
Bang

(10) Patent No.: US 12,252,189 B2
(45) Date of Patent: Mar. 18, 2025

(54) VEHICLE STEERING DEVICE

(71) Applicant: HL MANDO CORPORATION, Pyeongtaek-si (KR)

(72) Inventor: Kieon Bang, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/382,378

(22) Filed: Oct. 20, 2023

(65) Prior Publication Data

US 2024/0409151 A1    Dec. 12, 2024

(30) Foreign Application Priority Data

Jun. 9, 2023 (KR) .......................... 10-2023-0074438

(51) Int. Cl.
 *B62D 5/04* (2006.01)
 *B62D 3/12* (2006.01)
 *F16H 7/14* (2006.01)

(52) U.S. Cl.
 CPC ........... *B62D 5/0424* (2013.01); *B62D 3/126* (2013.01); *B62D 5/0403* (2013.01); *B62D 5/0448* (2013.01); *F16H 7/14* (2013.01)

(58) Field of Classification Search
 CPC .... B62D 5/0424; B62D 3/126; B62D 5/0403; B62D 5/0448; F16H 7/14
 See application file for complete search history.

(56) References Cited

U.S. PATENT DOCUMENTS

| | | | |
|---|---|---|---|
| 2005/0133297 A1* | 6/2005 | Chikaraishi | F16H 7/14 180/444 |
| 2005/0247514 A1* | 11/2005 | Heitzer | F16H 7/14 180/444 |

* cited by examiner

*Primary Examiner* — Terence Boes
(74) *Attorney, Agent, or Firm* — Hauptman Ham, LLP

(57) ABSTRACT

The present embodiments relate to a vehicle steering device. Specifically, there is provided a vehicle steering device comprising a motor housing surrounding a motor and having a mounting portion penetrated by a motor shaft and protruding in an axial direction of the motor shaft, a rack housing having a driving pulley embedded on one side and a driven pulley embedded on another side, the driving pulley being coupled to the motor shaft, a receiving recess being formed, toward a rack bar, in a mounting hole where the mounting portion is inserted and fitted, and a tension compensation mechanism installed in the receiving recess to support the motor housing to move in a direction opposite to a position of the rack bar.

16 Claims, 9 Drawing Sheets

VEHICLE STEERING DEVICE

CROSS-REFERENCE TO RELATED APPLICATION

This application claims priority from Korean Patent Application No. 10-2023-0074438, filed on Jun. 9, 2023, which is hereby incorporated by reference for all purposes as if fully set forth herein.

BACKGROUND

Field

The present embodiments relate to a vehicle steering device that allows steering of a vehicle to be performed by a motor.

Description of Related Art

The belt-type motor device includes a belt for connecting the motor shaft and the ball nut and transfers the power generated from the motor in proportion to the torque applied to the steering wheel to the rack bar via a ball nut.

This belt-type motor device has the advantage of preventing the vibration and impact of the rack bar from being directly transferred to the motor but may cause vibrations in the belt due to tension variations in the belt caused by wear to the belt or pulley, and the vibrations are delivered to the vehicle body, causing noise.

Further, if, during steering, the belt is driven by rotation of the motor shaft to rotate the ball nut, forces due to the belt tension act in the mutually pulling directions in the rack bar having the motor shaft and the ball nut. The forces generated in the mutually pulling directions concentrates on the bolted portions of the motor housing and the rack housing which are mechanically weakest parts, so that the belt tension is reduced due to loosening of the bolt due to the vibration and impact generated while the motor shaft rotates.

Such a change in the belt tension may cause noise between the driving pulley and driven pulley and the belt and damage to the belt.

BRIEF SUMMARY

The present embodiments may provide a vehicle steering device that may increase belt tension to prevent damage to the belt and noise by supporting the motor housing coupled to the rack housing to move in the direction opposite to where the rack bar is positioned to increase the inter-axis distance between the motor shaft and the rack bar.

In an aspect, the present embodiments may provide a vehicle steering device comprising a motor housing surrounding a motor and having a mounting portion penetrated by a motor shaft and protruding in an axial direction of the motor shaft, a rack housing having a driving pulley embedded on one side of the rack housing and a driven pulley embedded on another side thereof, the driving pulley being coupled to the motor shaft, a receiving recess being recessed, toward a rack bar to which the driven pulley is coupled, in a mounting hole where the mounting portion is inserted and fitted, and a tension compensation mechanism installed in the receiving recess to support the mounting portion so that the motor housing is movable in a direction opposite to a position of the rack bar.

The tension compensation mechanism according to the present embodiments includes a supporting member fitted into the receiving recess to support the mounting portion and an elastic member interposed between the receiving recess and the supporting member to elastically support the supporting member toward the mounting portion.

The supporting member according to the present embodiments has a concave portion in a surface supporting the mounting portion, the concave portion having a shape corresponding to the mounting portion.

The elastic member according to the present embodiments is a coil spring.

The tension compensation mechanism according to the present embodiments includes a cushioning member disposed between the supporting member and the mounting portion and coupled to the supporting member to absorb vibration and impact generated as the motor shaft rotates.

The tension compensation mechanism according to the present embodiments includes a guide member interposed between the receiving recess and the elastic member to support the elastic member and guiding movement of the supporting member to allow the supporting member to move toward the mounting portion or in an opposite direction away from the mounting portion.

The guide member according to the present embodiments includes a fixing portion interposed between the receiving recess and the elastic member to support the elastic member and an operation guide portion protruding from the fixing portion to the mounting portion and the supporting member to allow the supporting member to move toward the mounting portion or in the opposite direction.

The receiving recess according to the present embodiments includes a fitting protrusion protruding toward the mounting portion. The fixing portion includes a fitting recess to which the fitting protrusion is fitted and coupled to be fixed to the receiving recess.

The supporting member according to the present embodiments includes an insertion recess to which the operation guide portion is fitted to move toward the mounting portion or in the opposite direction.

The supporting member according to the present embodiments includes a guide recess recessed in an inner surface of the insertion recess along a length direction of the operation guide portion. The operation guide portion includes a guide protrusion protruding on an outer surface of the operation guide portion and movably fitted to the guide recess.

The guide protrusion according to the present embodiments is elastically supported by an elastic body to be inserted in the operation guide portion or protrudes outwardly from the outer surface of the operation guide portion to be fitted into the guide recess.

In another aspect, the present embodiments may provide a vehicle steering device comprising a motor housing surrounding a motor and having a mounting portion penetrated by a motor shaft and protruding in an axial direction of the motor shaft, a rack housing having a driving pulley embedded on one side of the rack housing and a driven pulley embedded on another side thereof, the driving pulley being coupled to the motor shaft, a receiving hole extending there through, toward a rack bar to which the driven pulley is coupled, in a mounting hole where the mounting portion is inserted and fitted, and a tension compensation mechanism installed in the receiving hole to support the mounting portion so that the motor housing is movable in a direction opposite to a position of the rack bar.

The tension compensation mechanism according to the present embodiments includes a supporting member fitted into the receiving hole to support the mounting portion, an elastic member elastically supporting the supporting member toward the mounting portion, and a guide member fastened to the receiving hole to support the elastic member and guiding movement of the supporting member to allow the supporting member to move toward the mounting portion or in an opposite direction away from the mounting portion.

The supporting member according to the present embodiments has a concave portion in a surface supporting the mounting portion, the concave portion having a shape corresponding to the mounting portion.

The tension compensation mechanism according to the present embodiments includes a cushioning member disposed between the supporting member and the mounting portion and coupled to the supporting member to absorb vibration and impact generated as the motor shaft rotates.

The guide member according to the present embodiments includes a fixing portion fastened to the receiving hole to support the elastic member and an operation guide portion rotatably coupled to the fixing portion and the supporting member to allow the supporting member to move toward the mounting portion or in the opposite direction.

The receiving hole according to the present embodiments has a threaded portion in an inner circumferential surface thereof. The fixing portion has a threaded portion in an outer circumferential surface thereof. The threaded portion of the receiving hole and the threaded portion of the fixing portion are engaged with each other to fasten the fixing portion to the receiving hole.

The supporting member according to the present embodiments includes an insertion recess to which the operation guide portion is fitted to move toward the mounting portion or in the opposite direction.

The supporting member according to the present embodiments includes a guide recess recessed in an inner surface of the insertion recess along a length direction of the operation guide portion. The operation guide portion includes a guide protrusion protruding on an outer surface of the operation guide portion and movably fitted to the guide recess.

The guide protrusion according to the present embodiments is elastically supported by an elastic body to be inserted in the operation guide portion or protrudes outwardly from the outer surface of the operation guide portion to be fitted into the guide recess.

According to the present embodiments, there may be provided a vehicle steering device that may increase belt tension to prevent damage to the belt and noise by supporting the motor housing coupled to the rack housing to move in the direction opposite to where the rack bar is positioned to increase the distance between the motor shaft and the rack bar shaft.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
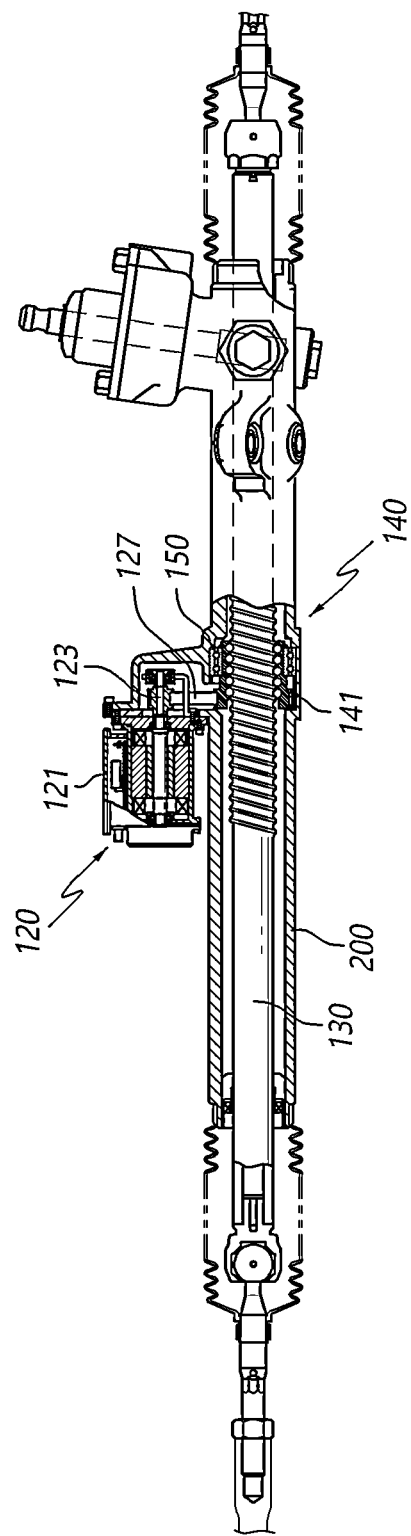
FIG. 1 is a partial cross-sectional view illustrating a vehicle steering device according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
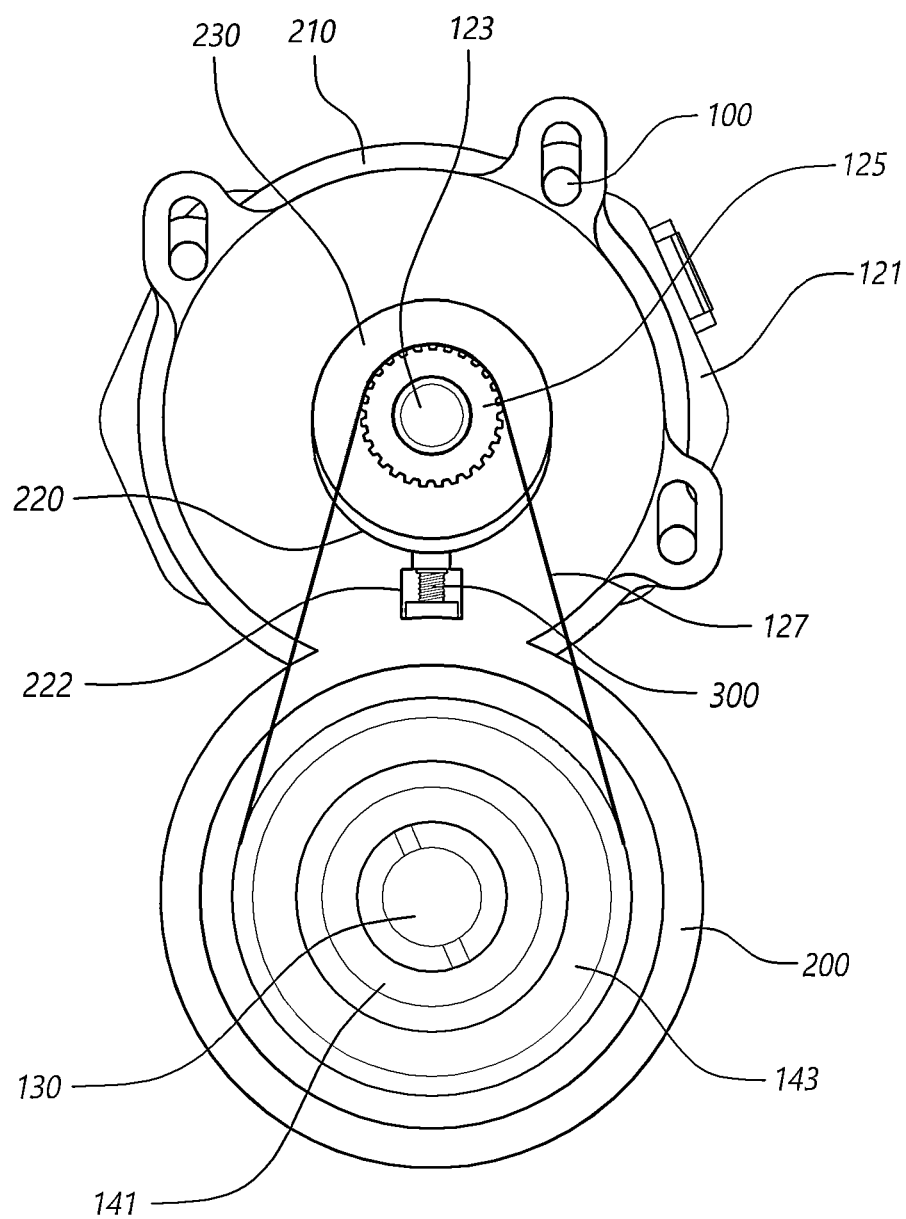
FIG. 2 is a side view illustrating a motor housing and a rack housing of a vehicle steering device according to an embodiment.
Figure 3:
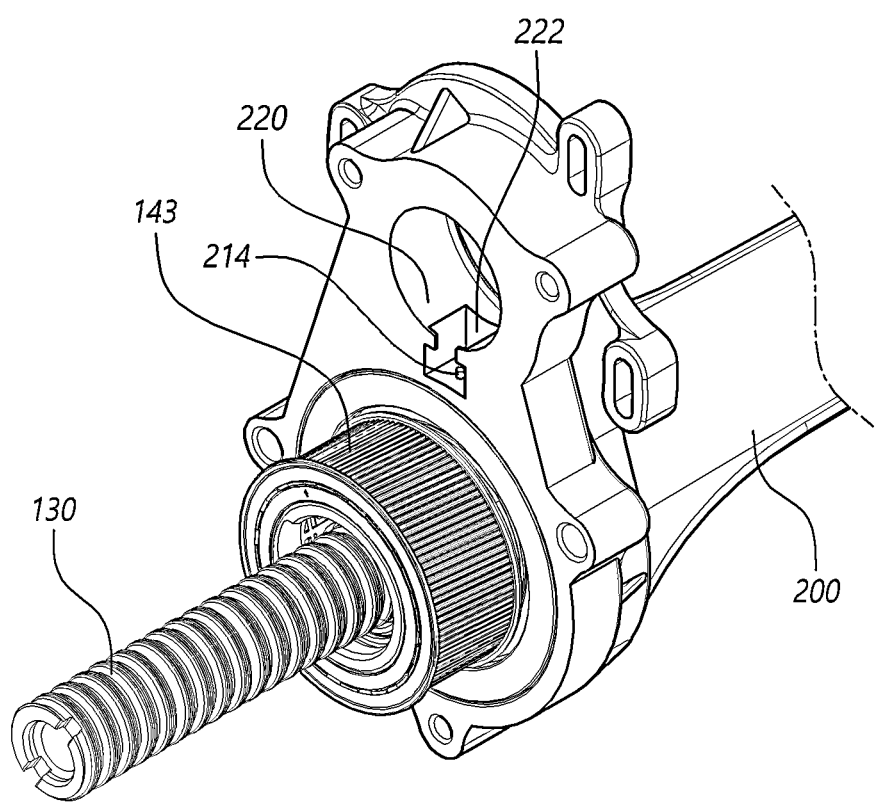
FIG. 3 is a perspective view illustrating a rack housing of a vehicle steering device according to an embodiment.
Figure 4:
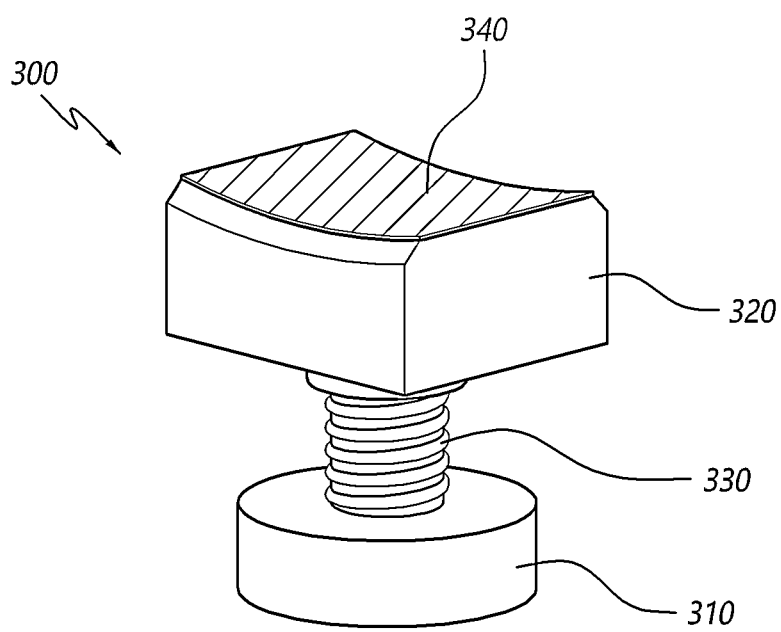
FIG. 4 is a perspective view illustrating a tension compensation mechanism of a vehicle steering device according to an embodiment.
Figure 5:
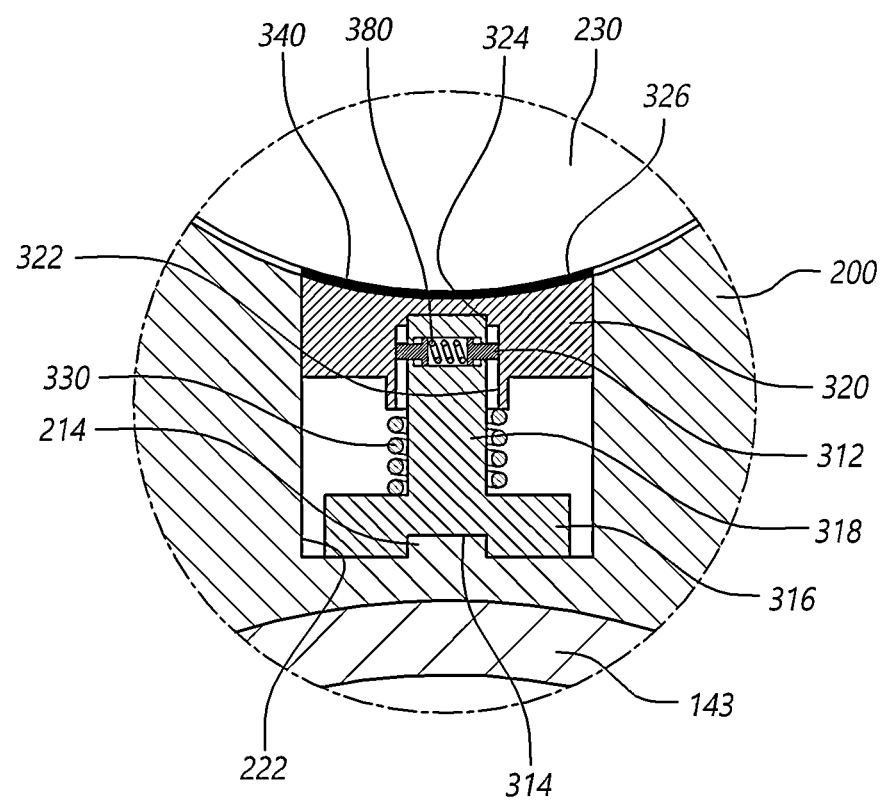
FIG. 5 is a cross-sectional view illustrating a tension compensation mechanism of a vehicle steering device according to an embodiment.
Figure 6:
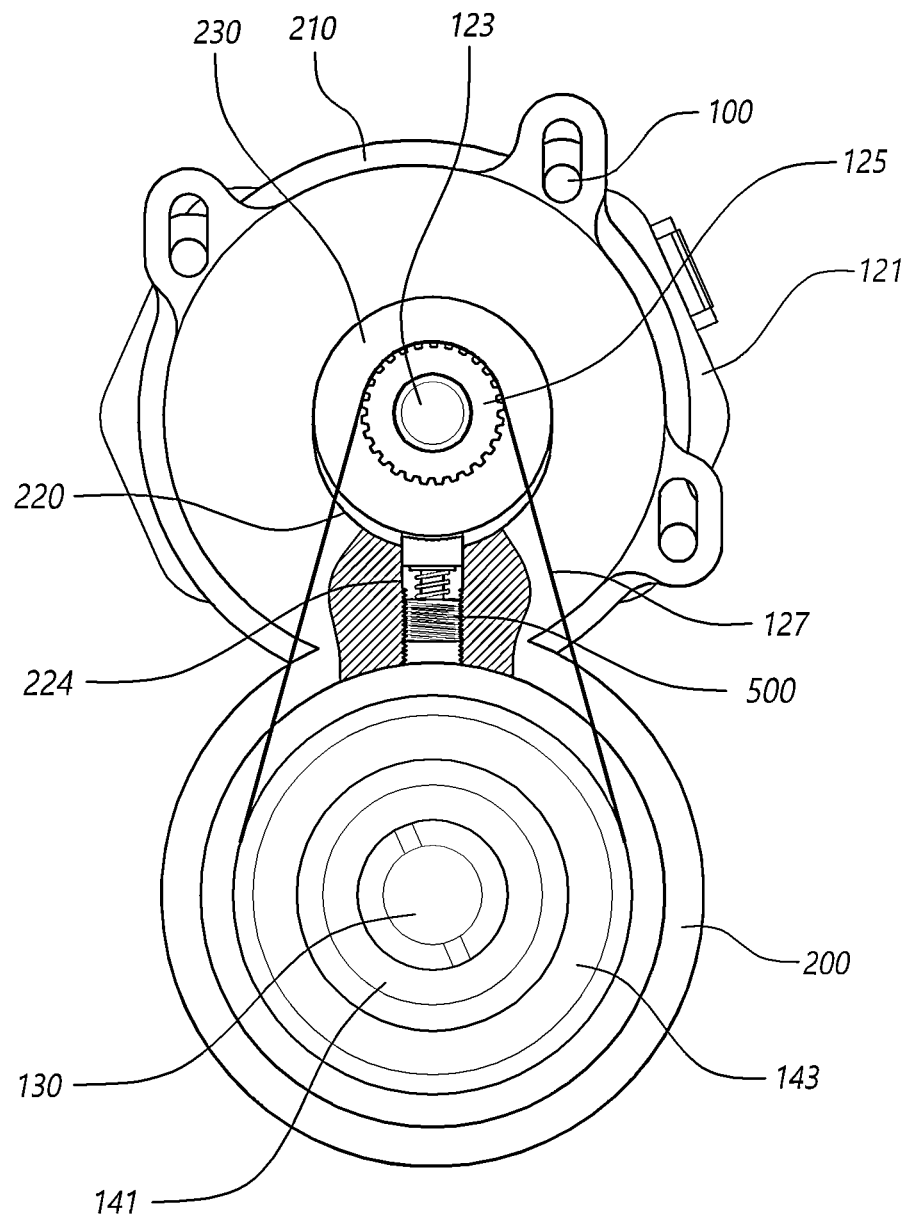
FIG. 6 is a side view illustrating a motor housing and a rack housing of a vehicle steering device according to an embodiment.
Figure 7:
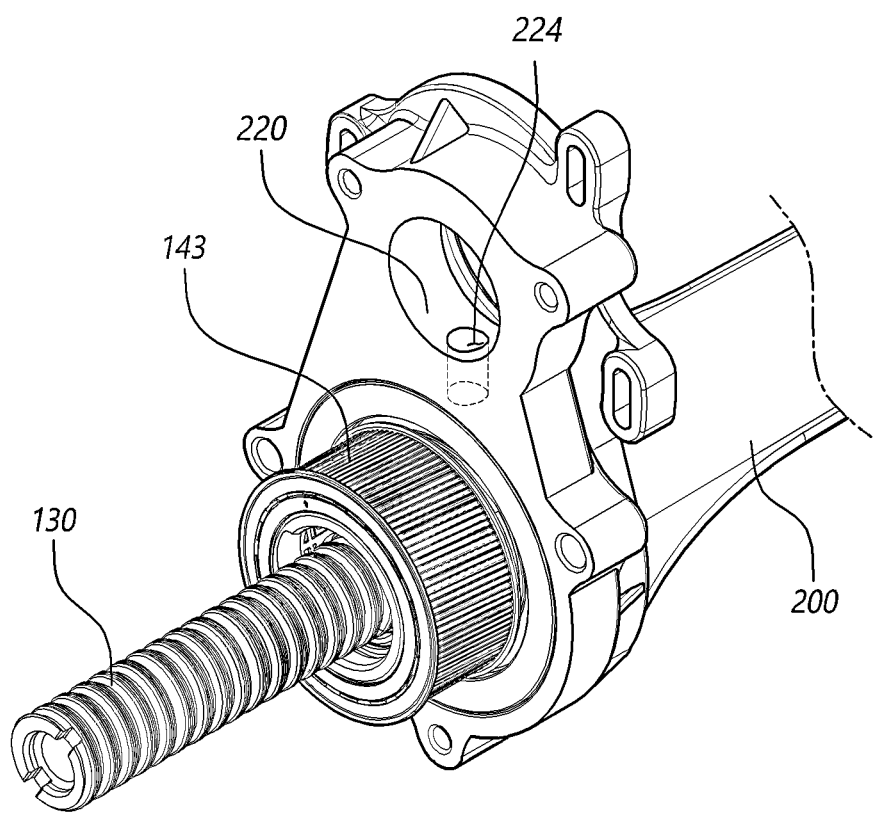
FIG. 7 is a perspective view illustrating a rack housing of a vehicle steering device according to another embodiment.
Figure 8:
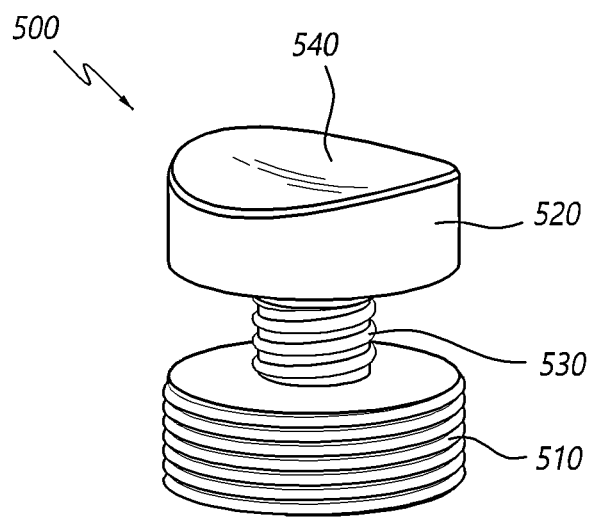
FIG. 8 is a perspective view illustrating a tension compensation mechanism of a vehicle steering device according to another embodiment.
Figure 9:
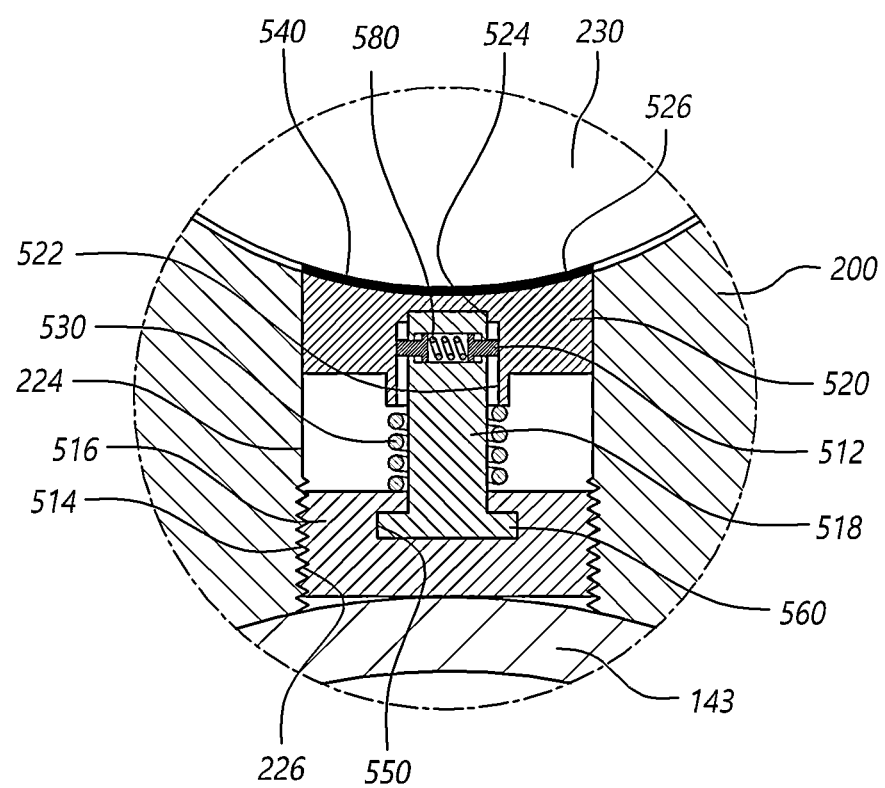
FIG. 9 is a cross-sectional view illustrating a tension compensation mechanism of a vehicle steering device according to another embodiment.

FIG. 1 is a partial cross-sectional view illustrating a vehicle steering device according to an embodiment. FIG. 2 is a side view illustrating a motor housing and a rack housing of a vehicle steering device according to an embodiment. FIG. 3 is a perspective view illustrating a rack housing of a vehicle steering device according to an embodiment. FIG. 4 is a perspective view illustrating a tension compensation mechanism of a vehicle steering device according to an embodiment. FIG. 5 is a cross-sectional view illustrating a tension compensation mechanism of a vehicle steering device according to an embodiment. FIG. 6 is a side view illustrating a motor housing and a rack housing of a vehicle steering device according to an embodiment. FIG. 7 is a perspective view illustrating a rack housing of a vehicle steering device according to another embodiment. FIG. 8 is a perspective view illustrating a tension compensation mechanism of a vehicle steering device according to another embodiment. FIG. 9 is a cross-sectional view illustrating a tension compensation mechanism of a vehicle steering device according to another embodiment.

Vehicle steering devices include motor driven power steering (MDPS) devices that assist the manipulation force of the steering wheel by a motor to provide the convenience of steering and steer-by-wire (SBW) steering devices that perform vehicle steering using a motor.

The tension compensation mechanism 300 according to the present embodiments may be applied to belt-type motor devices, such as column-type motor driven power steering (C-MDPS) steering devices, rack-driven motor driven power steering (R-MDPS) steering devices, or steer-by-wire (SBW) steering devices.

Here, in the present embodiments, a structure in which a tension compensation mechanism 300 is equipped in a rack-driven motor driven power steering (R-MDPS) device is described as an example, but without limitations thereto, it may be applied to any type of steering control devices.

As shown in FIGS. 1 and 2, a vehicle steering device includes a driving means 120 controlled to generate power by an electronic control unit (ECU) that determines the degree of steering of the steering wheel through a torque sensor mounted on the steering column, a rack bar 130 that moves the tie rod connected to the wheel according to the degree of steering of the steering wheel, and a driven means 140 that receives the rotational force of the driving means 120, converts the rotational force into an axial moving force and transfers the axial moving force to the rack bar 130.

The driving means 120 includes an electric motor 121 controlled by the electronic control unit (ECU), a driving pulley 125 coupled to a motor shaft 123 of the electric motor 121, and a belt 127 wound around the driving pulley 125. The driven means 140 includes a ball nut 141 supporting the rack bar 130 inside the rack housing 200 surrounding the rack bar 130 and a driven pulley 143 coupled to the outer circumferential surface of the ball nut 141.

The driving pulley 125 is coupled to an end portion of the motor shaft 123 extending outward of the electric motor 121, and the driven pulley 143 is coupled to the outer circumferential surface of the ball nut 141 supporting the rack bar 130.

The driving pulley 125 connected to the motor shaft 123 of the electric motor 121 and the driven pulley 143 coupled to the ball nut 141 are disposed parallel to each other.

The belt 127 is wound around the driving pulley 125 and the driven pulley 143 and transfers the rotational force of the electric motor 121 to the rack bar 130.

Accordingly, in the rack-driven motor driven power steering device, if the driving pulley 125 is rotated by the electric motor 121, the driven pulley 143 and the ball nut 141 are rotated via the belt 127, and the rack bar 130 is moved left and right by the operation of the ball nut 141, generating an assistance force.

In the so-structured rack-driven motor driven power steering device, forces act on the rack bar 130, equipped with the motor shaft 123 and the ball nut 141, in the mutually pulling directions, due to the tension of the belt 127, and the forces generated in the mutually pulling directions concentrate on the bolted portions of the motor housing 210 and the rack housing 200 which are mechanically weakest parts, so that the tension of the belt 127 is reduced to the loosening of the bolt due to the vibration and impact generated as the motor shaft 123 rotates.

A vehicle steering device according to an embodiment includes a motor housing 210 surrounding a motor 121 and having a mounting portion 230 penetrated by a motor shaft 123 and protruding in an axial direction of the motor shaft 123, a rack housing 200 having a driving pulley 125 embedded on one side and a driven pulley 143 embedded on another side, the driving pulley 125 being coupled to the motor shaft 123, a receiving recess 222 being formed, toward a rack bar, in a mounting hole 220 where the mounting portion 230 is inserted and fitted, and a tension compensation mechanism 300 installed in the receiving recess 222 to support the mounting portion 230 so that the motor housing 210 to move in a direction opposite to a position of the rack bar 130.

In the rack-driven motor driven power steering device, if the driving pulley 125 is rotated by rotation of the motor shaft 123, the driven pulley 143 and the ball nut 141 are also rotated through the belt 127 wound around the driving pulley 125 and the driven pulley 143 and, as the ball nut 141 is rotated, the rack bar 130 is linearly moved in the axial direction.

The rack housing 200 surrounds the rack bar 130, and seats the ball nut 141 surrounding the rack bar 130. For smooth rotation of the ball nut 141, a bearing 150 is provided between the outer circumferential surface of the ball nut 141 and the inner circumferential surface of the rack housing 200.

Further, on one side of the rack housing 200 is embedded the driving pulley 125 coupled to the motor shaft 123, the receiving recess 222 is formed, toward the rack bar, in the mounting hole 220 where the mounting portion 230 is inserted and fitted, and the driven pulley 143 is embedded on the other side.

The motor housing 210 surrounds the motor 121, and the mounting portion 230 penetrated by the motor shaft 123 is formed to protrude in the axial direction of the motor shaft 123.

The motor housing 210 is fixed to the rack housing 200 in a state in which the mounting portion 230 is inserted and fitted into the mounting hole 220 of the rack housing 200.

Here, the mounting hole 220 of the rack housing 200 is formed in a long circular shape to be moved toward the rack bar 130 or in the opposite direction in a state in which the mounting portion 230 is inserted and fitted.

In this case, the motor housing 210 is supported on the tension compensation mechanism 300 installed in the receiving recess 222 of the rack housing 200 to move in the direction opposite to the position of the rack bar and is fixed to the rack housing 200 with the tension of the belt 127 adjusted.

Here, the motor housing 210 is fixed to the rack housing 200 through a fastening member 100, e.g., a bolt to maintain the tension of the belt 127. If the fastening force of the fastening member 100 or the tension of the belt 127 is reduced, the tension of the belt 127 may be maintained by the tension compensation mechanism 300.

Referring to FIGS. 3 to 5, the tension compensation mechanism 300 is installed in the receiving recess 222 to support the mounting portion 230 to allow the motor housing 210 to move in the direction opposite to the position of the rack bar 130.

The tension compensation mechanism 300 of the vehicle steering device according to an embodiment includes a supporting member 320 fitted into the receiving recess 222 to support the mounting portion 230, an elastic member 330 interposed between the receiving recess 222 and the supporting member 320 to elastically support the supporting member 320 toward the mounting portion 230, and a guide member 310 interposed between the receiving recess 222 and the elastic member 330 to support the elastic member 330 and guiding movement of the supporting member 320 to allow the supporting member 320 to move toward the mounting portion 230 or in the opposite direction.

The supporting member 320 is formed in a shape corresponding to the receiving recess 222 to be fitted into the receiving recess 222, supporting the mounting portion 230.

For example, if the receiving recess 222 is formed as a circular recess, the supporting member 320 and the fixing portion 316 of the guide member 310 may be formed in a cylindrical shape corresponding to the receiving recess 222.

Further, if the receiving recess 222 is formed as a polygonal recess, the supporting member 320 and the fixing portion 316 of the guide member 310 may be formed in a polygonal column shape corresponding to the receiving recess 222.

Here, the supporting member 320 has a concave portion 326 in a shape surrounding a portion of the outer circumferential surface of the mounting portion 230, in the surface supporting the mounting portion 230.

In this case, the concave portion 326 is formed in a curved shape corresponding to the outer circumferential surface of the mounting portion 230 to surround and support a portion of the outer circumferential surface of the mounting portion 230 formed in a cylindrical shape.

The elastic member 330 is a member that elastically supports the supporting member 320 toward the mounting portion 230 and is preferably a coil spring, but is not limited thereto.

Further, the tension compensation mechanism 300 includes a cushioning member 340 disposed between the supporting member 320 and the mounting portion 230 and coupled to the supporting member 320 to absorb the vibration and impact generated as the motor shaft 123 rotates.

The cushioning member 340 is coupled to the supporting member 320 to be disposed between the supporting member 320 and the mounting portion 230 and is formed of rubber or urethane to absorb the vibration and impact generated as the motor shaft 123 rotates.

The guide member 310 includes a fixing portion 316 interposed between the receiving recess 222 and the elastic member 330 to support the elastic member 330 and an operation guide portion 318 formed to protrude from the fixing portion 316 to the mounting portion 230 and guiding movement of the supporting member 320 to allow the supporting member 320 to move toward the mounting portion 230 or in the opposite direction.

The fixing portion 316 is interposed between the receiving recess 222 and the elastic member 330 to support the elastic member 330, and the operation guide portion 318 is formed to protrude from the fixing portion 316 to the mounting portion 230 to guide movement of the supporting member 320 to allow the supporting member 320 to move toward the mounting portion 230 or in the opposite direction.

Further, the supporting member 320 includes an insertion recess 324 to which the operation guide portion 318 is fitted to move toward the mounting portion 230 or in the opposite direction.

The insertion recess 324 is formed to have a diameter corresponding to the diameter of the operation guide portion 318 to allow the supporting member 320 to move along the length direction of the operation guide portion 318.

Further, the supporting member 320 includes a guide recess 322 along the length direction of the operation guide portion 318 in an inner surface of the insertion recess 324, and the operation guide portion 318 includes a guide protrusion 312 that is formed to protrude on the outer surface and is movably fitted into the guide recess 322.

The guide recess 322 is formed, along the length direction of the operation guide portion 318, in the inner surface of the insertion recess 324 to allow the supporting member 320 to reciprocate while being guided by the guide protrusion 312.

The guide protrusion 312 is formed to protrude on the outer surface of the operation guide portion 318 and is fitted into the guide recess 322, guiding the movement of the supporting member 320.

Accordingly, the supporting member 320 is reciprocated along the length direction of the guide recess 322 by the guide protrusion 312.

In this case, the guide protrusion 312 may be elastically supported by an elastic body 380 to be inserted in the operation guide portion 318 or may protrude outward of the operation guide portion 318 to be fitted into the guide recess 322 to be coupled to be inserted into or removed from the operation guide portion 318.

Here, the receiving recess 222 includes a fitting protrusion 214 that is formed to protrude toward the mounting portion 230. The fixing portion 316 includes a fitting recess 314 to which the fitting protrusion 214 is fitted and coupled to be fixed to the receiving recess 222.

The fitting protrusion 214 is formed to protrude toward the mounting portion 230 in the receiving recess 222 to support the fixing portion 316.

The fitting recess 314 is formed to have a diameter corresponding to the diameter of the fitting protrusion 214 so that the fixing portion 316 is supported on the fitting protrusion 214 and fixed to the receiving recess 222.

Accordingly, as the fitting protrusion 214 is fitted and coupled to the fitting recess 314, the tension compensation mechanism 300 is supported on the rack housing 200 to stably support the motor housing 210.

In this case, the guide member 310, the elastic member 330, the supporting member 320, and the cushioning member 340, in the assembled state, may be inserted into the receiving recess 222 to support the mounting portion 230 to allow the motor housing 210 to move in the direction opposite to the position of the rack bar 130.

A vehicle steering device according to another embodiment includes a motor housing 210 surrounding a motor 121 and having a mounting portion 230 penetrated by a motor shaft 123 and protruding in an axial direction of the motor shaft 123, a rack housing 200 having a driving pulley 125 embedded on one side and a driven pulley 143 embedded on another side, the driving pulley 125 being coupled to the motor shaft 123, a receiving hole 224 being formed through, toward a rack bar, in a mounting hole 220 where the mounting portion 230 is inserted and fitted, and a tension compensation mechanism 500 installed in the receiving hole 224 to support the mounting portion 230 so that the motor housing 210 to move in a direction opposite to a position of the rack bar 130.

In the rack-driven motor driven power steering device, if the driving pulley 125 is rotated by rotation of the motor shaft 123, the driven pulley 143 and the ball nut 141 are also rotated through the belt 127 wound around the driving pulley 125 and the driven pulley 143 and, as the ball nut 141 is rotated, the rack bar 130 is linearly moved in the axial direction.

Referring to FIG. 6, the rack housing 200 surrounds the rack bar 130, and seats the ball nut 141 surrounding the rack bar 130. For smooth rotation of the ball nut 141, a bearing 150 is provided between the outer circumferential surface of the ball nut 141 and the inner circumferential surface of the rack housing 200.

Further, on one side of the rack housing 200 is embedded the driving pulley 125 coupled to the motor shaft 123, the receiving hole 224 is formed, toward the rack bar, in the mounting hole 220 where the mounting portion 230 is inserted and fitted, and the driven pulley 143 is embedded on the other side.

The motor housing 210 surrounds the motor 121, and the mounting portion 230 penetrated by the motor shaft 123 is formed to protrude in the axial direction of the motor shaft 123.

The motor housing 210 is fixed to the rack housing 200 in a state in which the mounting portion 230 is inserted and fitted into the mounting hole 220 of the rack housing 200.

Here, the mounting hole 220 of the rack housing 200 is formed in a long circular shape to be moved toward the rack bar 130 or in the opposite direction in a state in which the mounting portion 230 is inserted and fitted.

In this case, the motor housing 210 is supported on the tension compensation mechanism 500 installed in the receiving hole 224 of the rack housing 200 to move in the direction opposite to the position of the rack bar and is fixed to the rack housing 200 with the tension of the belt 127 adjusted.

Here, the motor housing 210 is fixed to the rack housing 200 through a fastening member 100, e.g., a bolt to maintain the tension of the belt 127. If the fastening force of the fastening member 100 or the tension of the belt 127 is reduced, the tension of the belt 127 may be maintained by the tension compensation mechanism 500.

Referring to FIGS. 7 to 9, the tension compensation mechanism 500 is installed in the receiving hole 224 to support the mounting portion 230 to allow the motor housing 210 to move in the direction opposite to the position of the rack bar 130.

The tension compensation mechanism 500 of the vehicle steering device according to the other embodiment includes a supporting member 320 fitted into the receiving hole 224 to support the mounting portion 230, an elastic member 530 elastically supporting the supporting member 520 toward the mounting portion 230, and a guide member 510 fastened to the receiving hole 224 to support the elastic member 530 and guiding movement of the supporting member 520 to allow the supporting member 520 to move toward the mounting portion 230 or in the opposite direction.

The supporting member 520 is formed in a shape corresponding to the receiving hole 224 to be fitted into the receiving hole 224, supporting the mounting portion 230.

For example, if the receiving hole 224 is formed as a circular hole, the supporting member 520 may be formed in a cylindrical shape corresponding to the receiving hole 224.

Alternatively, one side of the receiving hole 224 and the supporting member 520 may be formed in a polygonal hole and a polygonal column shape, respectively, corresponding to each other, and the other side of the receiving hole 224 and the fixing portion 516 of the guide member 510 may be formed in a circular hole and cylindrical shape, respectively, corresponding to each other.

Here, the supporting member 520 has a concave portion 526 in a shape surrounding a portion of the outer circumferential surface of the mounting portion 230, in the surface supporting the mounting portion 230.

In this case, the concave portion 526 is formed in a curved shape corresponding to the outer circumferential surface of the mounting portion 230 to surround and support a portion of the outer circumferential surface of the mounting portion 230 formed in a cylindrical shape.

The elastic member 530 is a member that elastically supports the supporting member 520 toward the mounting portion 230 and is preferably a coil spring, but is not limited thereto.

The guide member 510 is fastened to the receiving hole 224 to support the elastic member 530 and guides the movement of the supporting member 520 to allow the supporting member 520 to move toward the mounting portion 230 or in the opposite direction.

Further, the tension compensation mechanism 500 includes a cushioning member 540 disposed between the supporting member 520 and the mounting portion 230 and coupled to the supporting member 520 to absorb the vibration and impact generated as the motor shaft 123 rotates.

The cushioning member 540 is coupled to the supporting member 520 to be disposed between the supporting member 520 and the mounting portion 230 and is formed of rubber or urethane to absorb the vibration and impact generated as the motor shaft 123 rotates.

The guide member 510 includes a fixing portion 516 fastened to the receiving hole 224 to support the elastic member 530 and an operation guide portion 518 rotatably coupled to the fixing portion 516 and guiding movement of the supporting member 520 to allow the supporting member 520 to move toward the mounting portion 230 or in the opposite direction.

The fixing portion 516 is fastened to the receiving hole 224 to support the elastic member 530, and the operation guide portion 518 is rotatably coupled to the fixing portion 516 and guides the movement of the supporting member 520 to allow the supporting member 520 to move toward the mounting portion 230 or in the opposite direction.

In this case, the fixing portion 516 has a stopping recess 550 formed to have a larger diameter in the inner circumferential surface, and the operation guide portion 518 has a stopping protrusion 560 formed to have a larger diameter on the outer circumferential surface, and the stopping protrusion 560 is fitted into the stopping recess 550.

Accordingly, when the tension compensation mechanism 500 rotates the fixing portion 516 in one direction or the opposite direction to be fastened to the receiving hole 224, the operation guide portion 518 does not rotate but may move toward the mounting portion 230 or in the opposite direction, guiding the supporting member 520.

In other words, the tension compensation mechanism 500 rotates only the fixing portion 516 of the guide member 510 with the concave portion 526 in tight contact with the mounting portion 230 to be fastened to the receiving hole 224.

In this case, the fixing portion 516 has a threaded portion 514 including mountains and valleys in the outer circumferential surface, and the receiving hole 224 has a threaded portion 226 corresponding to the threaded portion of the fixing portion 516 in the inner circumferential surface.

Therefore, the fixing portion 516 is fastened to the receiving hole 224 as the threaded portion 514 formed in the outer circumferential surface is engaged with the threaded portion 226 formed in the inner circumferential surface of the receiving hole 224.

In this case, the fixing portion 516 may be press-fitted into the receiving hole 224, or the fixing portion 516 and the receiving hole 224 may be coupled as a protrusion formed in either the fixing portion 516 or the receiving hole 224 is fitted into a recess formed in the other.

Further, the supporting member 520 includes an insertion recess 524 to which the operation guide portion 518 is fitted to move toward the mounting portion 230 or in the opposite direction.

The insertion recess 524 is formed to have a diameter corresponding to the diameter of the operation guide portion 518 to allow the supporting member 520 to move along the length direction of the operation guide portion 518.

Further, the supporting member 520 includes a guide recess 522 formed along the length direction in the inner surface of the insertion recess 524, and the operation guide portion 518 includes a guide protrusion 512 fitted into the guide recess 522 to move along the guide recess 522 in the outer circumferential surface.

The guide recess 522 is formed, along the length direction of the operation guide portion 518, in the inner surface of the insertion recess 524 to allow the supporting member 520 to reciprocate while being guided by the guide protrusion 512.

The guide protrusion 512 is formed to protrude on the outer surface of the operation guide portion 518 and is fitted into the guide recess 522, guiding the movement of the supporting member 520.

Accordingly, the supporting member 520 is reciprocated along the length direction of the guide recess 522 by the guide protrusion 512.

In this case, the guide protrusion 512 may be elastically supported by an elastic body 580 to be inserted in the operation guide portion 518 or may protrude outward of the operation guide portion 518 to be fitted into the guide recess 522 to be coupled to be inserted into or removed from the operation guide portion 518.

Here, the guide member 510, the elastic member 530, the supporting member 520, and the cushioning member 540, in the assembled state, may be inserted into the receiving hole 224 to support the mounting portion 230 to allow the motor housing 210 to move in the direction opposite to the position of the rack bar 130.

According to the present embodiments, it is possible to increase the tension of the belt 127 to thereby prevent damage to the belt 127 and noise by supporting the motor housing 210 coupled to the rack housing 200 to move in the direction opposite to the position of the rack bar 130 to increase the inter-axis distance between the motor shaft 123 and the rack bar 130.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering device, comprising:
    a motor housing surrounding a motor and having a mounting portion penetrated by a motor shaft and protruding in an axial direction of the motor shaft;
    a rack housing having a driving pulley embedded on one side of the rack housing and a driven pulley embedded on another side of the rack housing, the driving pulley being coupled to the motor shaft, the rack housing further including a receiving recess being recessed, toward a rack bar to which the driven pulley is coupled, in a mounting hole where the mounting portion is inserted and fitted; and
    a tension compensation mechanism installed in the receiving recess to support the mounting portion so that the motor housing is movable in a direction opposite to a position of the rack bar,
    wherein the tension compensation mechanism includes:
        a supporting member fitted into the receiving recess to support the mounting portion; and
        an elastic member interposed between the receiving recess and the supporting member to elastically support the supporting member toward the mounting portion, and
    wherein the supporting member has a concave portion in a surface supporting the mounting portion, the concave portion having a shape corresponding to the mounting portion.

2. The vehicle steering device of claim 1, wherein the elastic member is a coil spring.

3. The vehicle steering device of claim 1, wherein the tension compensation mechanism includes a cushioning member disposed between the supporting member and the mounting portion and coupled to the supporting member to absorb vibration and impact generated as the motor shaft rotates.

4. A vehicle steering device, comprising:
    a motor housing surrounding a motor and having a mounting portion penetrated by a motor shaft and protruding in an axial direction of the motor shaft;
    a rack housing having a driving pulley embedded on one side of the rack housing and a driven pulley embedded on another side of the rack housing, the driving pulley being coupled to the motor shaft, the rack housing further including a receiving recess being recessed, toward a rack bar to which the driven pulley is coupled, in a mounting hole where the mounting portion is inserted and fitted; and
    a tension compensation mechanism installed in the receiving recess to support the mounting portion so that the motor housing is movable in a direction opposite to a position of the rack bar, wherein the tension compensation mechanism includes:
a supporting member fitted into the receiving recess to support the mounting portion; and
an elastic member interposed between the receiving recess and the supporting member to elastically support the supporting member toward the mounting portion, and
wherein the tension compensation mechanism includes a guide member interposed between the receiving recess and the elastic member to support the elastic member and guiding movement of the supporting member to allow the supporting member to move toward the mounting portion or in an opposite direction away from the mounting portion.

5. The vehicle steering device of claim 4, wherein the guide member includes:
a fixing portion interposed between the receiving recess and the elastic member to support the elastic member; and
an operation guide portion protruding from the fixing portion to the mounting portion and the supporting member to allow the supporting member to move toward the mounting portion or in the opposite direction.

6. The vehicle steering device of claim 5, wherein the receiving recess includes a fitting protrusion protruding toward the mounting portion, and
wherein the fixing portion includes a fitting recess to which the fitting protrusion is fitted and coupled to be fixed to the receiving recess.

7. The vehicle steering device of claim 5, wherein the supporting member includes an insertion recess to which the operation guide portion is fitted to move toward the mounting portion or in the opposite direction.

8. The vehicle steering device of claim 7, wherein the supporting member includes a guide recess recessed in an inner surface of the insertion recess along a length direction of the operation guide portion, and
wherein the operation guide portion includes a guide protrusion protruding on an outer surface of the operation guide portion and movably fitted to the guide recess.

9. The vehicle steering device of claim 8, wherein the guide protrusion is elastically supported by an elastic body to be inserted in the operation guide portion or protrudes outwardly from the outer surface of the operation guide portion to be fitted into the guide recess.

10. A vehicle steering device, comprising:
a motor housing surrounding a motor and having a mounting portion penetrated by a motor shaft and protruding in an axial direction of the motor shaft;
a rack housing having a driving pulley embedded on one side of the rack housing and a driven pulley embedded on another side of the rack housing, the driving pulley being coupled to the motor shaft, the rack housing further including a receiving hole extending there through, toward a rack bar to which the driven pulley is coupled, in a mounting hole where the mounting portion is inserted and fitted; and
a tension compensation mechanism installed in the receiving hole to support the mounting portion so that the motor housing is movable in a direction opposite to a position of the rack bar,
wherein the tension compensation mechanism includes:
a supporting member fitted into the receiving hole to support the mounting portion;
an elastic member elastically supporting the supporting member toward the mounting portion; and
a guide member fastened to the receiving hole to support the elastic member and guiding movement of the supporting member to allow the supporting member to move toward the mounting portion or in an opposite direction away from the mounting portion, and
wherein the supporting member has a concave portion in a surface supporting the mounting portion, the concave portion having a shape corresponding to the mounting portion.

11. The vehicle steering device of claim 10, wherein the tension compensation mechanism includes a cushioning member disposed between the supporting member and the mounting portion and coupled to the supporting member to absorb vibration and impact generated as the motor shaft rotates.

12. The vehicle steering device of claim 10, wherein the guide member includes:
a fixing portion fastened to the receiving hole to support the elastic member; and
an operation guide portion rotatably coupled to the fixing portion and the supporting member to allow the supporting member to move toward the mounting portion or in the opposite direction.

13. The vehicle steering device of claim 12, wherein the receiving hole has a threaded portion in an inner circumferential surface thereof, wherein the fixing portion has a threaded portion in an outer circumferential surface thereof, and wherein the threaded portion of the receiving hole and the threaded portion of the fixing portion are engaged with each other to fasten the fixing portion to the receiving hole.

14. The vehicle steering device of claim 12, wherein the supporting member includes an insertion recess to which the operation guide portion is fitted to move toward the mounting portion or in the opposite direction.

15. The vehicle steering device of claim 14, wherein the supporting member includes a guide recess recessed in an inner surface of the insertion recess along a length direction of the operation guide portion, and
wherein the operation guide portion includes a guide protrusion protruding on an outer surface of the operation guide portion and movably fitted to the guide recess.

16. The vehicle steering device of claim 15, wherein the guide protrusion is elastically supported by an elastic body to be inserted in the operation guide portion or protrudes outwardly from the outer surface the operation guide portion to be fitted into the guide recess.

* * * * *